United States Patent [19]

Taylor

[11] 4,111,536

[45] Sep. 5, 1978

[54] AUTOMATIC REGISTRATION OF PROJECTOR IMAGES

[75] Inventor: Charles L. Taylor, Binghamton, N.Y.

[73] Assignee: The Singer Company, Binghamton, N.Y.

[21] Appl. No.: 701,208

[22] Filed: Jun. 30, 1976

[51] Int. Cl.² .................................... G03B 29/00
[52] U.S. Cl. .................... 352/132; 35/12 N; 35/25; 273/101.1; 352/70; 352/89; 352/133
[58] Field of Search ............... 352/132, 133, 89, 70, 352/92; 35/11 A, 12 N, 25; 273/101.1

[56] References Cited

U.S. PATENT DOCUMENTS

| | | | |
|---|---|---|---|
| 2,563,892 | 8/1951 | Waller | 352/70 |
| 2,747,456 | 5/1956 | Waller | 352/70 |
| 3,179,002 | 4/1965 | Carpenter | 352/89 |
| 3,281,519 | 10/1966 | Giordano | 35/12 N |
| 3,904,204 | 9/1975 | Yokoi | 273/101.1 |
| 3,945,133 | 3/1976 | Mohon | 35/25 |
| 3,964,178 | 6/1976 | Marshall | 35/25 |

*Primary Examiner*—Monroe H. Hayes
*Attorney, Agent, or Firm*—Ronald Reichman; Jeffrey Rothenberg

[57] ABSTRACT

A system for registering images produced by projectors on a screen or other viewing surface is described herein. Two or more projectors are used with a laser attached to one of the projectors. The laser emits a reference point on the screen and a light-sensitive sensor such as a diode array or TV camera is connected to the other projector to allow a determination of the reference point. One motion system is connected to one of the projectors and the laser and another motion system is connected to the other projector and the sensor. A computer is coupled to both motion systems, the laser and the sensor so that the computer will cause the projectors to move so that the images produced by the projectors are always registered and are believable to an observer.

16 Claims, 1 Drawing Figure

U.S. Patent   Sept. 5, 1978   4,111,536
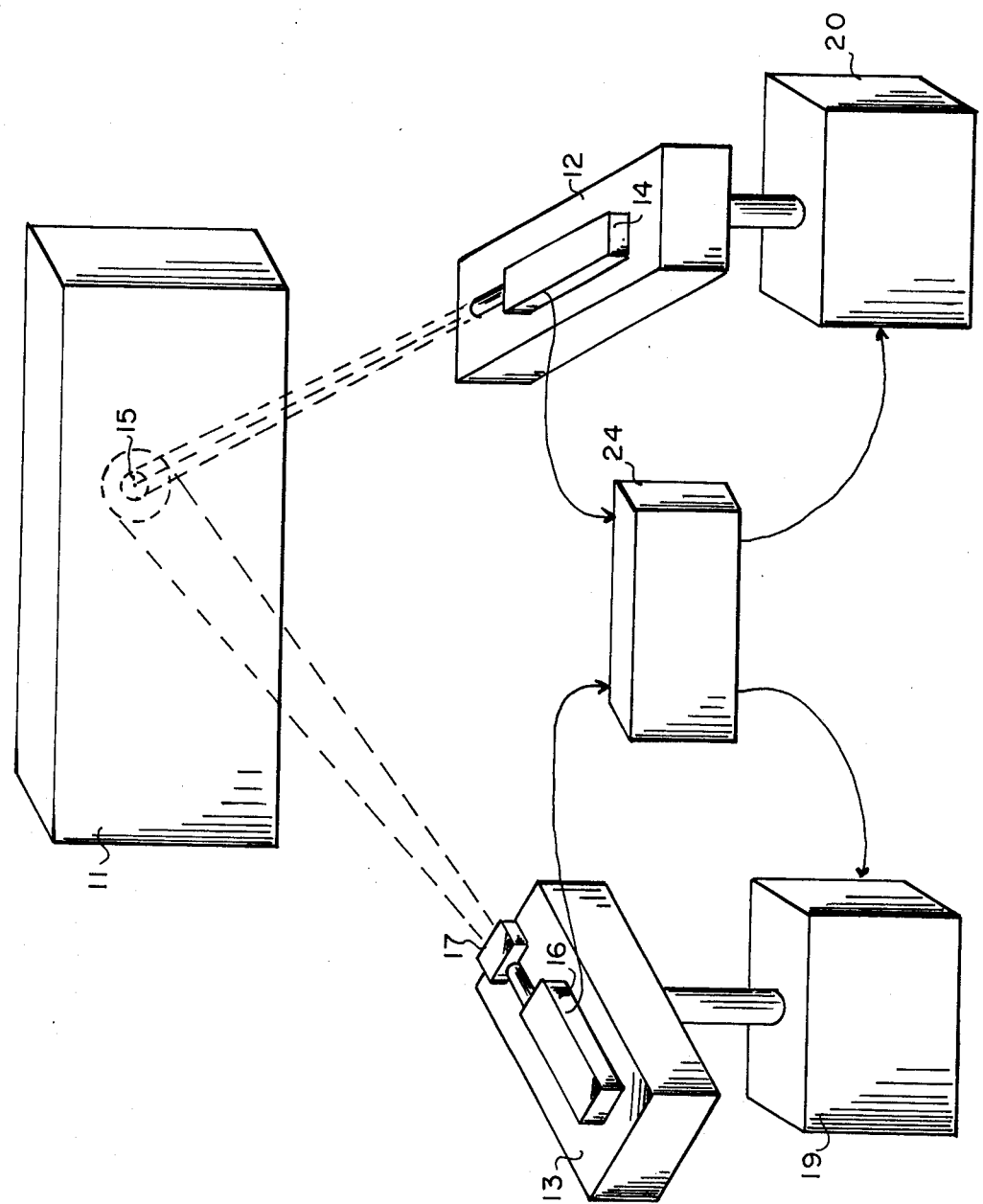

AUTOMATIC REGISTRATION OF PROJECTOR IMAGES

BACKGROUND OF THE INVENTION

1. Field of the Invention

This invention relates to optical systems and, more particularly, to the automatic registration of images produced by two or more projectors.

DESCRIPTION OF THE PRIOR ART

To create a visual impression of an actual scene, a person would produce a pictorial representation of that scene. An ordinary photographic picture will suffice when all the objects in the scene are standing still. However, when one of the objects in the scene is moving, a motion picture must be used in order to accurately reproduce the desired dynamic scene. The production of a motion picture involves two phases: the taking of the picture with a camera, and the displaying of the picture with a projector. The camera captures the action by taking a series of still pictures at regular intervals and the projector transmits at a predetermined frequency the images of the still pictures on a screen, causing an observer to believe that the objects appearing on the screen are moving.

When people view a motion picture, they believe they are seeing the actual scene. Thus, a motion picture may be a useful training device. In fact, motion pictures are used in the visual systems of training simulators so that a student may see the environment of the device that he is learning how to use.

The simulation of an aircraft landing on an aircraft carrier flight deck is accomplished by taking a motion picture from the cockpit of an airplane during an actual landing and displaying this motion picture to a student pilot who is manipulating the simulated airplane controls. The student's controls are synchronized with a visual system of the simulator. Hence, if the student pilot is not on the correct glide path, the flight deck will not appear in the correct position to effect a safe landing.

It would be beneficial to an aircraft carrier pilot's training if an instructor could test the pilot's response to some unexpected event. For instance, what course of action would the pilot pursue if he were waved off and not given permission to land? A method employed by the prior art to simulate the aircraft carrier landing entailed the making and combining of two motion pictures. The first motion picture is taken from the cockpit of an airplane undergoing its final approach, showing the aircraft carrier as seen from the pilot's window, and the second motion picture shows the Landing Signal Officer guiding the pilot to a safe landing or waving the pilot off. The first motion picture is projected on a screen and the images of the Landing Signal Officer is superimposed on the first motion picture. Thus, a composite picture showing the Landing Signal Officer on a carrier deck as seen through the pilot's window was produced. At the instructor's option, the picture showing the Landing Signal Officer signaling the pilot to land, or the motion picture depicting the Landing Signal Officer refusing the pilot permission to land may be shown. The motion picture showing the aircraft carrier deck was projected on a screen by one projector and the motion picture of the Landing Signal Officer was projected on the same screen by another projector. Both projectors were placed on motion systems so that the pilot would see a different picture as he attempted to land a simulated airplane upon a simulated aircraft carrier deck. The nature of the electronics was such that one projector did not have any information pertaining to the location of the image produced by the other projector. It only knew where the other projector had been commanded to go. This open loop type of operation was such that small errors in the pointing of the projector caused the image of the Landing Signal Officer to be improperly registered upon the image of the aircraft carrier deck, creating a spurious composite picture that appeared artificial to the student pilot and consequently hindered his training.

SUMMARY OF THE INVENTION

This invention overcomes the disadvantages of the prior art by providing a system for the automatic registration of images that are projected from two or more different sources. Television projectors, motion picture projectors, etc., may be used as sources for the projection of images. By using the apparatus of this invention, it is possible to produce a believable composite picture.

The production of a composite picture is necessary for certain types of training. For instance, in a locomotive training simulator, it would be beneficial to the student's training if the instructor could determine the student's reaction when the signal light changes from green to yellow to red. This invention provides an apparatus that is capable of registering the following type of images: a motion picture taken from the cabin of a moving locomotive showing the view that would be seen by the engineer, and motion pictures taken of green, yellow and red lights. When the instructor desires, he may change the color of the signal lights and note the student's response. The picture that is produced shows the relative motion of the signal light as the train passes down the track and the surrounding background appears to the student to be an infinity. Furthermore, the green, yellow and red signals that appear on the signal light are at the correct positions on the signal light and the light that the instructor decides to turn on is of a sufficient luminosity to enable a student to see the light. Thus, the apparatus of the invention produces a realistic composite picture that is suitable for training.

It is an object of this invention to provide a new and improved apparatus for registering images.

It is a further object of this invention to provide a new and improved display device that can be used for training.

Other objects and advantages of this invention will become apparent as the following description proceeds, which description should be considered together with the accompanying drawing.

BRIEF DESCRIPTION OF THE DRAWING

The single FIGURE is a perspective representation showing the apparatus of this invention.

DESCRIPTION OF A PREFERRED EMBODIMENT

Referring now to the single FIGURE of the drawings in detail, the reference character 11 represents a viewing surface such as a projection screen. The pictures produced by projector 12 and projector 13 are focused on screen 11. An emitter source that produces a collimated beam of light, such as laser 14, is connected to projector 12. The light emitted from laser 14 is aimed at any arbitrary point 15 on screen 11. An image sensor 16 similar to Cromeco's Model C-1024 image sensor (manufactured by Cromeco of 26655 Laurel, Los Altos, California 94022) is connected to projector 13 so that sensor 16 detects the location of point 15 on screen 11. A prism 17 is placed in front of sensor 16. Prism 17 rejects the background light and passes the reflected emitter 14 light. Projector 13 with sensor 16 and prism 17 is coupled to servo 19 and projector 12 and laser 14 is coupled to servo 20. Digital computer 24 is coupled to sensor 16, laser 14, servo 19, and servo 20. Computer 24 receives input signals from sensor 16 and laser 14, informing the computer of the location of arbitrary point 15. Computer 24 computes the difference in azimuth and elevation of the location of arbitrary point 15 and a geographic point on sensor 16. From the above computations, the computer determines and produces a voltage that is proportional to the error in azimuth and elevation between the projected laser point 15 and the known geographic point on sensor 16. The output voltage produced by computer 24 is used to drive either servo 19 or 20 so that no error signal will be produced and point 15 will be detected at the geographic point on sensor 16. Thus, one projector will track the other projector and, if the projectors are originally aligned to produce a realistic composite picture on screen 11, the images produced by both projectors will always be registered.

The above specification has described a new and improved system for registering images produced by projectors on a screen. It is realized that the above description may indicate to those skilled in the art additional ways in which the principles of this invention may be used without departing from its spirit. It is, therefore, intended that this invention be limited only by the scope of the appended claims.

What is claimed is:

1. A system for registering overlapping projector produced images, said system comprising:
   a. a viewing surface;
   b. at least a first projector that projects different images on said viewing surface;
   c. at least a second projector that projects at different times at least two different types of images on said viewing surface that overlap the image produced by said first projector, said second projector being under the control of an operator who determines and controls the type of image that will be projected by said second projector in a given instant of time;
   d. a laser pointed in the direction of said viewing surface and at any location of the image produced by said first projector, said laser attached to said first projector so that said laser will emit a reference point on said viewing surface;
   e. means for sensing the location of said reference point on said viewing surface attached to said second projector, said sensing means having a known geographic detection point and being pointed in the direction of said viewing surface at a location of the image produced by said second projector;
   f. a first means for moving connected to said first projector, permitting said first projector with said laser attached thereto to be moved relative to said viewing surface so that the image produced by said first projector and the reference point emitted by said laser may be moved across said viewing surface with said reference point always pointing to the same relative location of the image produced by said first projector;
   g. a second means for moving connected to said second projector, permitting said second projector with said sensing means attached thereto to be moved relative to said viewing surface so that said sensing means may track said reference point; and
   h. computation and control means coupled to said laser, said sensing means, and said first and second moving means for calculating the location of said reference point relative to said image produced by said first projector; the type of image that is produced by said second projector under the direction and control of said operator using the information supplied by said sensing means and said laser so that said computation means may compute the difference in azimuth and elevation between said reference point and said geographic point and produce a voltage that is proportional to the error in azimuth and elevation between said reference point and said geographic point causing said control means to signal and cause said first or second moving means to move, whereby said sensing means will always be locked on said reference point and the images produced by said first and second projectors will always be registered on said viewing surface and produce a believable composite picture.

2. The system defined in claim 1 wherein said projectors are cathode ray tubes.

3. The system defined in claim 1 wherein said viewing surface is a motion picture screen.

4. The system defined in claim 1 wherein said viewing surface is an optical surface.

5. The system defined in claim 1 wherein said viewing surface is a mirror.

6. The system defined in claim 1 wherein said first and said second projectors are television projector systems.

7. The system defined in claim 1 wherein said first and said second projectors are motion picture projectors.

8. The system defined in claim 1 wherein said first and said second projectors are still picture projectors.

9. The system defined in claim 1 wherein said computation and control means is an analog computer.

10. The system defined in claim 1 wherein said computation and control means is a hybrid computer.

11. The system defined in claim 1 wherein said sensing means is a diode sensing array.

12. The system defined in claim 1 wherein said sensing means is a television camera.

13. The system defined in claim 1 wherein said sensing means is a light sensing device.

14. The system defined in claim 1 wherein said first means for moving said first projector and said laser comprises a first servo being coupled to said first projector and said computation and control means so that the signal produced by said computation means will cause said servo to move said first projector so that the images produced by said second projectors will be registered on said viewing surface.

15. The system defined in claim 1 wherein said second means for moving said second projector and said sensing means comprises:
   a. a prism being attached in front of said sensing means; and
   b. a second servo being coupled to said second projector and said computation and control means so that the signal produced by said computation means will cause said second servo to move said second projector so that the images produced by said first and said second projectors will be registered on said viewing surface.

16. The system defined in claim 1 wherein said computation and control means is a digital computer.

* * * * *

UNITED STATES PATENT AND TRADEMARK OFFICE
CERTIFICATE OF CORRECTION

PATENT NO. : 4,111,536
DATED : September 5, 1978
INVENTOR(S) : Charles L. Taylor It is certified that error appears in the above-identified patent and that said Letters Patent are hereby corrected as shown below:

Col. 3, line 1, change "Cromeco's" to --Cromemco's--.

Col. 3, line 2, change "Cromeco" to --Cromemco--.

Col. 3, line 4, Insert the following after "11".
--Projector 13 is capable of producing at least two different types of images on screen 11. The operator of the projector determines and controls the type of image that will be produced by projector 13.--

Signed and Sealed this

Fifth Day of June 1979

[SEAL]

Attest:

RUTH C. MASON
Attesting Officer

DONALD W. BANNER
Commissioner of Patents and Trademarks